(12) United States Patent
Campbell et al.

(10) Patent No.: US 6,932,521 B2
(45) Date of Patent: Aug. 23, 2005

(54) OPTICAL ASSEMBLY AND METHOD FOR FABRICATION THEREOF

(75) Inventors: Scott P. Campbell, Thousand Oaks, CA (US); Gary Fang, Camarillo, CA (US)

(73) Assignee: Oplink Communications, Inc., Fremont, CA (US)

( * ) Notice: Subject to any disclaimer, the term of this patent is extended or adjusted under 35 U.S.C. 154(b) by 54 days.

(21) Appl. No.: 10/741,052

(22) Filed: Dec. 19, 2003

(65) Prior Publication Data

US 2004/0136663 A1 Jul. 15, 2004

Related U.S. Application Data

(60) Provisional application No. 60/437,195, filed on Dec. 31, 2002.

(51) Int. Cl.[7] .............................. G02B 6/36; G02B 6/32; G02B 6/26; G02B 6/42; G01N 21/00
(52) U.S. Cl. ............................. 385/93; 385/33; 385/34; 385/51; 385/52; 385/76; 385/77; 385/78; 385/80; 385/90; 385/91; 385/92; 356/73.1
(58) Field of Search ............................... 385/33, 34, 51, 385/52, 76–78, 80, 90–93; 356/73.1

(56) References Cited

U.S. PATENT DOCUMENTS

| | | | | | |
|---|---|---|---|---|---|
| 5,588,081 | A | * | 12/1996 | Takahashi | 385/93 |
| 6,532,325 | B2 | * | 3/2003 | Liu et al. | 385/34 |
| 6,633,701 | B2 | * | 10/2003 | Li et al. | 385/34 |
| 2003/0063853 | A1 | * | 4/2003 | Huang et al. | 385/34 |

* cited by examiner

*Primary Examiner*—Brian Healy
*Assistant Examiner*—Jerry Martin Blevins
(74) *Attorney, Agent, or Firm*—Scot A. Reader, Esq.

(57) ABSTRACT

An optical assembly includes a fiber optic pigtail, a sleeve in which the pigtail is housed, a collimating lens, a rod upon which is mounted an optical device and a lens sleeve in which the lens and rod are housed. Bonding lines bond the rod and lens to the lens sleeve, the pigtail to the pigtail sleeve, and the pigtail sleeve to the lens sleeve. The optical assembly and method of fabrication thereof support multiple optical device geometries, longitudinal adjustment of the position of the optical device within the optical assembly, an extended bonding line between the optical device and the environment outside the optical assembly, full x-y-z positioning of the pigtail relative to the lens and reduced reliance on bonding line thickness irregularities.

8 Claims, 3 Drawing Sheets

OPTICAL ASSEMBLY AND METHOD FOR FABRICATION THEREOF

CROSS-REFERENCE OF RELATED APPLICATION

This application claims the benefit of U.S. provisional application No. 60/437,195, filed on Dec. 31, 2002, the contents of which are incorporated herein by reference.

BACKGROUND OF THE INVENTION

Component alignment is an important part of the fabrication process for many types of optical assemblies. One reason is that light emitted from an optical fiber is highly divergent. Due to this high degree of divergence, unacceptable insertion loss, insertion loss ripple and wavelength dependent loss will often occur within an optical assembly unless light is directed between the components thereof with precision. Such precision is typically ensured only through careful alignment of the components during fabrication. Another reason component alignment is important is the desire for adaptable optical assemblies that support varied performance requirements. Fine-tuning the alignment of components of an optical assembly during fabrication is one way to meet varied performance requirements.

Unfortunately, the geometries of known optical assemblies have been ill-suited to either achieving acceptable insertion loss and insertion loss ripple, or accommodating varied performance requirements, or both, while still maintaining acceptable system robustness and cost characteristics. There is accordingly a need for an improved optical assembly geometry, and a fabrication process therefor, that are better suited to achieve these stated objectives.

SUMMARY OF THE INVENTION

In one aspect, the present invention provides an optical assembly of a type that couples light from one or more optical fibers to an optical device that induces an action on the light and reflects the light back to one or more optical fibers. In a preferred embodiment, the optical assembly includes a fiber optic pigtail, a sleeve in which the pigtail is housed, a collimating lens, a rod upon which is mounted an optical device, and a lens sleeve in which the lens and rod are housed. Bonding lines bond the rod and lens to the lens sleeve, the pigtail to the pigtail sleeve, and the pigtail sleeve to the lens sleeve.

The mounting of the optical device on the rod before insertion into a lens sleeve provides several advantages relative to direct insertion of the optical device into the lens sleeve. Among them, it allows the optical assembly to support multiple optical device geometries; it allows longitudinal adjustment of the position of the optical device within the optical assembly to meet performance objectives; it allows an extended bonding line between the optical device and the environment outside the optical assembly; and it reduces reliance on bonding line thickness irregularities in the optical assembly to meet performance objectives.

The use of a separate pigtail sleeve and lens sleeve provides several advantages relative to the use of an integrated sleeve. Among them, it allows for full x-y-z positioning of the pigtail relative to the lens to meet performance objectives; and it reduces reliance on bonding line thickness irregularities in the optical assembly to meet performance objectives.

In another aspect, the present invention provides a method for fabrication of the optical assembly. In a preferred embodiment, the fabrication method includes the steps of bonding the lens to the lens sleeve; bonding the optical device to the rod; adjustably combining the pigtail and the pigtail sleeve; adjustably combining the lens sleeve, rod and pigtail sleeve; monitoring performance of the assembly and adjusting the relative positions of the rod, lens sleeve, pigtail and pigtail sleeve until initial performance objectives are met; bonding the rod to the lens sleeve; monitoring performance of the assembly and adjusting the relative positions of the lens sleeve, pigtail and pigtail sleeve until final performance objectives are met; and bonding the pigtail to the pigtail sleeve and the pigtail sleeve to the lens sleeve.

The first monitoring and adjusting step advantageously allows the z position and θ roll angle of the rod, and the x-y-z positions and θ roll angle of the pigtail, to be adjusted to meet initial performance objectives. The second monitoring and adjusting step advantageously allows the pigtail and pigtail sleeve to be adjusted in x-y-z-θ relative to one another and the other components of the optical assembly to meet final performance objectives.

These and other aspects of the present invention may be better understood by reference to the following detailed description, taken in conjunction with the accompanying drawings that are briefly described below. Of course, the actual scope of the invention is defined by the appended claims.

DETAILED DESCRIPTION OF THE PREFERRED EMBODIMENT

Figure 1:
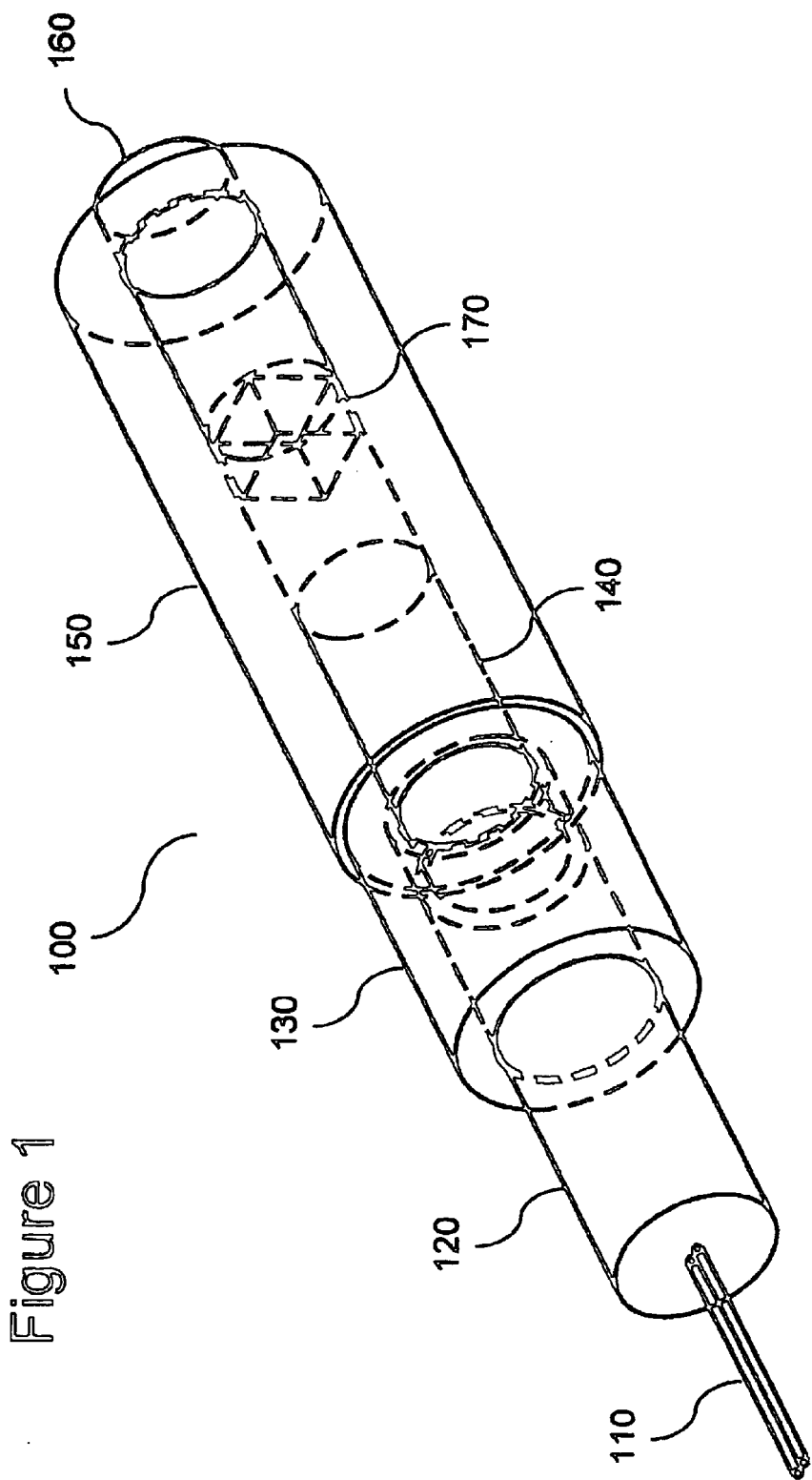
FIG. 1 is a perspective view of an optical assembly in a preferred embodiment of the invention.

In FIG. 1, a perspective view of an optical assembly 100 is shown in a preferred embodiment. Optical assembly 100 includes optical fibers 110 housed within a pigtail 120, which is in turn housed within a pigtail sleeve 130. Although a dual fiber arrangement is shown, an optical assembly operative within the scope of the invention may have one or more fibers. Pigtail sleeve 130 is coupled to a lens sleeve 150 in which is housed a lens 140 and a rod 160. Mounted on rod 160 is an optical device 170, such as a Gires-Tournois etalon (GTE), a thin-film filter, a Faraday garnet, a waveplate, or a more complex optical structure. Optical device 170 may have any of numerous geometries, such as rectangular, square or round. Components 110 through 160 are preferably made of glass, although other material compositions are possible.

In operation, inbound light enters optical assembly 100 on one of fibers 110, travels through pigtail 120 on the one of fibers 110 and is emitted from the one of fibers 110 into free space between pigtail 120 and lens 140. The light reaches lens 140 where it is subjected to angular and focal adjustments prior to being emitted from lens 140 into free space between lens 140 and optical device 170. The light reaches optical device 170 where a desired action is induced on the light prior to reflecting the light back through lens 140 and into the other one of fibers 110.

For example, where optical device 170 is a GTE, optical device 170 has a first mirror that is partially reflective, a second mirror that is fully reflective and a glass cavity in between. The spacing between the mirrors (i.e. the thickness of the glass cavity) is generally a function of the channel spacing of a Dense Wave Division Multiplexing (DWDM) system in which optical assembly 100 is operative. Light arriving from lens 140 enters and exits optical device 170 through the partially reflective mirror. Optical device 170 subjects different wavelength components of the light to variable delay in accordance with its resonant properties. That is, the partial reflectivity of the first mirror causes certain wavelength components to be restrained in the glass cavity between the first mirror and the second mirror longer than others. Optical device 170 thereby imposes a group delay on the wavelength components of the light which can correct group velocity dispersion previously induced on the light's pulses by a high speed, long haul, DWDM transmission system. The light may make multiple passes through optical assembly 100 in order to amplify the actions induced by optical device 170.

Of course, optical device 170 need not be a GTE and optical assembly 100 may be operative in systems other than DWDM systems. Moreover, it will be appreciated that the light may enter and exit optical assembly 110 on the same one of fibers 110.

Figure 2:
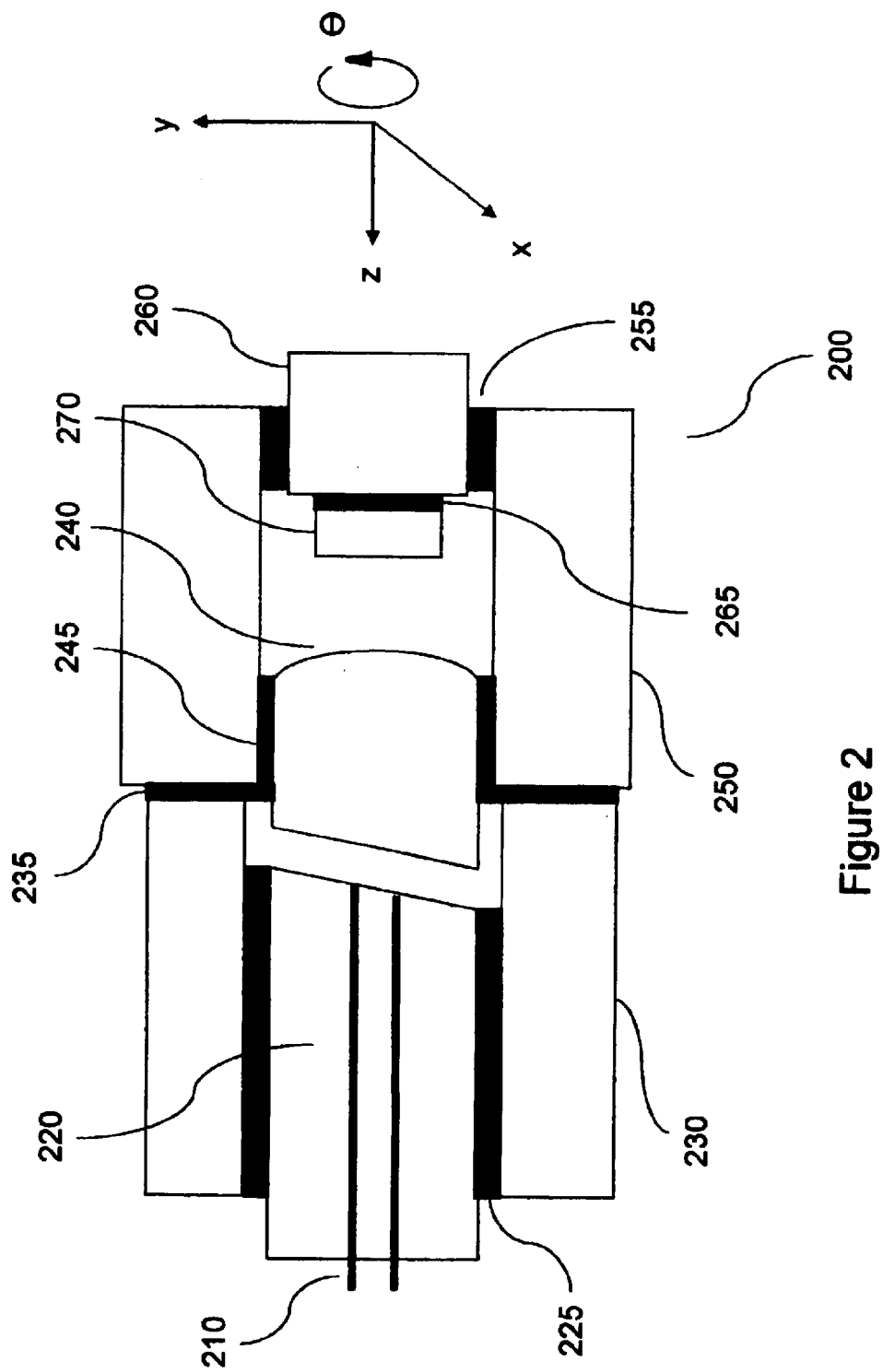
FIG. 2 is a cross-sectional view of an optical assembly in a preferred embodiment of the invention.

Turning to FIG. 2, a cross sectional view of an optical assembly 200 is shown in a preferred embodiment. Optical assembly 200 includes components 210, 220, 230, 240, 250, 260, 270 that have counterparts in components 110, 120, 130, 140, 150, 160, 170 discussed above in connection with FIG. 1. Additionally, FIG. 2 shows bonding lines 225, 235, 245, 255, 265 that bond components together. Bonding line 225 bonds pigtail 220 with pigtail sleeve 230, bonding line 235 bonds pigtail sleeve 230 with lens sleeve 250, bonding line 245 bonds lens 240 with lens sleeve 250, bonding line 255 bonds rod 260 with lens sleeve 250 and bonding line 265 bonds optical device 270 with rod 260. Bonding lines 225, 235, 245, 255, 265 are preferably epoxy bonding lines created by allowing epoxy to wick into the interfaces between the respective components at elevated temperatures and holding the respective components securely until the epoxy cures. Each one of bonding lines 225, 235, 245, 255, 265 is preferably thin and of substantially uniform thickness, improving the imperviousness and insensitivity of optical assembly 200 to external environmental fluctuations after assembly, such as wide thermal excursions, high humidity and harsh mechanical shock. The coupling of optical device 270 to lens sleeve 250 via rod 260 advantageously enables bonding line 255 to be longer than a bonding line that would result from direct coupling of optical device 270 to lens sleeve 250, further reducing the susceptibility of optical assembly 200 to external environmental influences that could adversely impact on performance.

Figure 3:
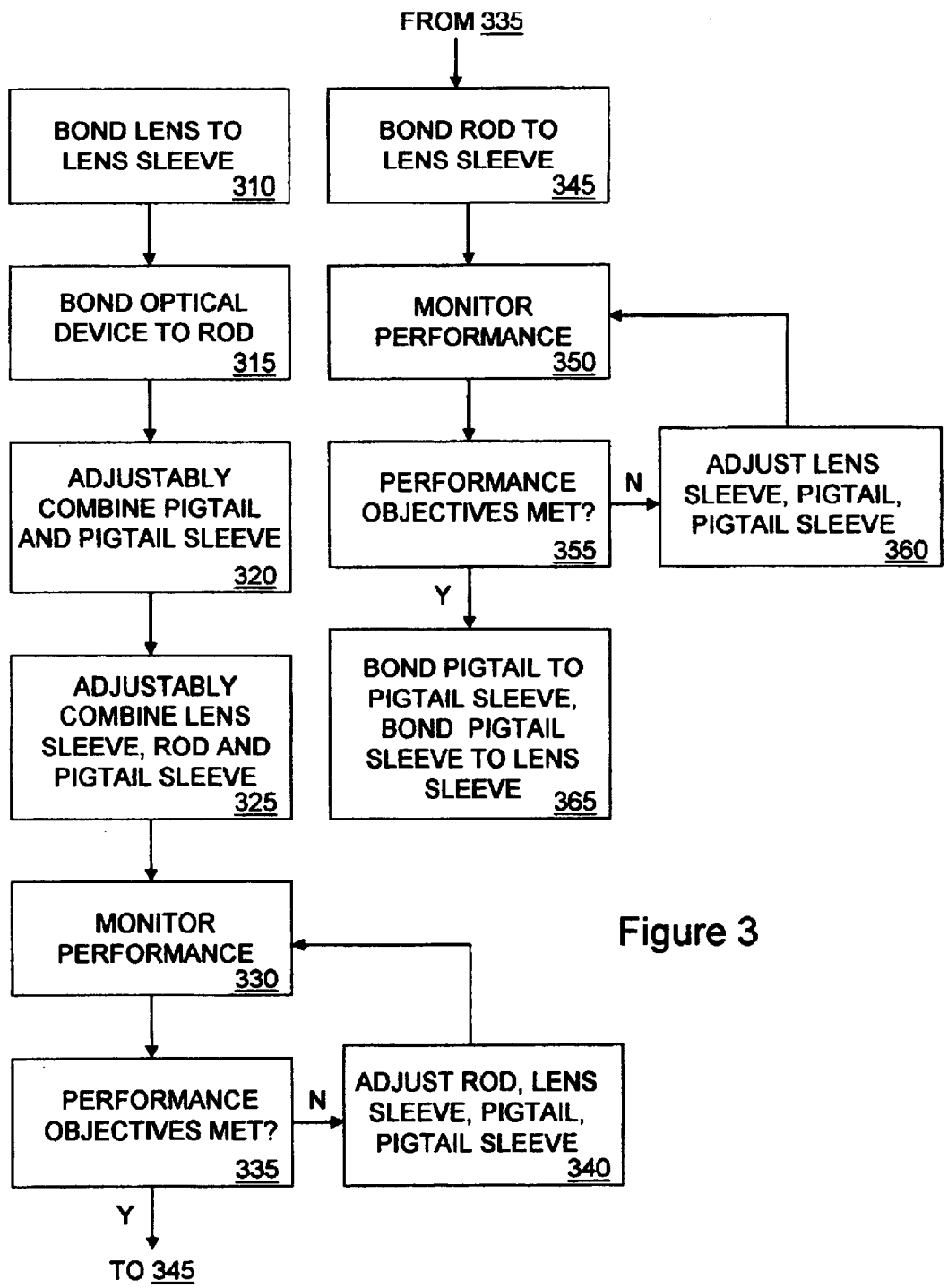
FIG. 3 is a flow diagram describing a method for fabricating an optical assembly in a preferred embodiment of the invention.

Turning now to FIG. 3, in conjunction with FIG. 2, a flow diagram illustrates a method for fabricating optical assembly 200 in a preferred embodiment.

In Step 310, lens is bonded to lens sleeve 250. Lens 240 is inserted into lens sleeve 250 a pre-defined but tolerant depth. Lens 240 and lens sleeve 250 are heated and epoxy is allowed to wick between lens 240 and lens sleeve 250. The components are held securely until the epoxy cures. When cured, the epoxy forms bonding line 245.

In Step 315, optical device 270 is bonded to rod 260. Optical device 270 is placed adjacent to one end of rod 260. Optical device 270 and rod 260 are heated and epoxy is allowed to wick between optical device 270 and rod 260. The components are held securely until the epoxy cures. When cured, the epoxy forms bonding line 265. Alternatively, optical device 270 may be optically contacted to one end of rod 260.

In Step 320, pigtail 220 and pigtail sleeve 230 are adjustably combined. Pigtail 220 is inserted into pigtail sleeve 230 a pre-defined but tolerant depth.

In Step 325, lens sleeve 250, rod 260 and pigtail sleeve 230 are adjustably combined to form an adjustably combined optical assembly. Lens sleeve 250, rod 260 and pigtail sleeve 230 are held relative to one another at a position that approximates their position in the finally assembled state, and the components are heated.

In Steps 330, 335 and 340, performance of the adjustably combined optical assembly is monitored and the relative position of the components is adjusted in response to performance feedback until initial performance objectives are met. For example, insertion loss as a function of frequency is monitored using either a light source and an optical spectrum analyzer, or a wavelength domain component analyzer. Adjustments in relative position are made manually to reduce overall insertion loss while at the same time obtaining a desired insertion loss ripple pattern. Alternatively, adjustments to relative position may be automated using equipment known in the art. Adjustments may be made, for example, to the z position and θ roll angle of rod 260 and the x-y-z positions and θ roll angle of pigtail 220.

In Step 345, rod 260 is bonded to lens sleeve 250 once initial performance objectives are met. When, for example, insertion loss, insertion loss ripple and wavelength dependent loss measurements are in sufficient conformance with initial performance objectives, epoxy is allowed to wick between rod 260 and lens sleeve 250. The components are held securely until the epoxy cures. When cured, the epoxy forms bonding line 255.

In Steps 350, 355 and 360, performance of the adjustably combined optical assembly is monitored and the relative position of the components is adjusted in response to performance feedback until final performance objectives are met. These steps allows for fine adjustments in system performance that may be necessary or desirable after initial performance objectives have been met. Pigtail 220 and pigtail sleeve 230 may be adjusted in x-y-z-θ relative to one another and lens sleeve 235 until final performance objectives are met.

In Step 365, pigtail 220 is bonded to pigtail sleeve 230 and pigtail sleeve 230 is bonded to lens sleeve 250 once final performance objectives are met. When, for example, insertion loss, insertion loss ripple and wavelength dependent loss measurements are in sufficient conformance with final performance objectives, epoxy is allowed to wick between pigtail 220 and pigtail sleeve 230, and between pigtail sleeve 230 and lens sleeve 250. The components are held securely until the epoxy cures. When cured, the epoxy forms bonding lines 225 and 235, respectively.

It will be appreciated by those of ordinary skill in the art that the invention may be embodied in other specific forms with out departing from the spirit or essential character hereof. The present description is therefore considered in all respects illustrative and not restrictive. The scope of the invention is indicated by the appended claims, and all changes that come within the meaning and range of equivalents thereof are intended to be embraced therein.

We claim:

1. An optical assembly of a type that couples light from one or more optical fibers to an optical device that induces an action on the light and reflects the light back to one or more optical fibers, the optical assembly comprising:
   a first sleeve housing a lens and a rod to which an optical device is attached; and
   a second sleeve housing a pigtail including one or more optical fibers, wherein the first sleeve and second sleeve are coupled and;
   wherein the optical device is an etalon.

2. The optical assembly of claim 1, wherein the first sleeve and second sleeve are bonded in response to a determination that a performance objective for the optical assembly has been satisfied.

3. The optical assembly of claim 2, wherein the performance objective relates to one or more of insertion loss, insertion loss ripple and wavelength dependent loss.

4. The optical assembly of claim 1, wherein the first sleeve and the rod are bonded in response to a determination that a performance objective for the optical assembly has been satisfied.

5. The optical assembly of claim 4, wherein the performance objective relates to one or more of insertion loss, insertion loss ripple and wavelength dependent loss.

6. The optical assembly of claim 1, wherein the second sleeve and the pigtail are bonded in response to a determination that a performance objective for the optical assembly has been satisfied.

7. The optical assembly of claim 6, wherein the performance objective relates to one or more of insertion loss, insertion loss ripple and wavelength dependent loss.

8. The optical assembly of claim 1, wherein the first sleeve and the lens are bonded.

* * * * *